United States Patent [15] 3,706,931
Subramanian [45] Dec. 19, 1972

[54] APPARATUS FOR USE IN MEASURING PHASE DISPERSION PRODUCED BY APPARATUS OR A SYSTEM

[72] Inventor: Mahadevan Subramanian, Whippany, N.J. 07981

[73] Assignee: Bell Telephone Laboratories Incorporated, Murray Hill, N.J.

[22] Filed: April 1, 1971

[21] Appl. No.: 130,269

[52] U.S. Cl.............325/67, 324/57 DE, 324/83 R, 325/363
[51] Int. Cl...............................................H04b 3/46
[58] Field of Search ....324/57 R, 57 DE, 57 H, 83 R, 324/83 A, 85; 325/67, 363, 431, 434, 442; 329/50

[56] References Cited

UNITED STATES PATENTS

| 3,449,748 | 6/1969 | Thyssens | 324/85 X |
| 3,210,667 | 10/1965 | Hern et al. | 325/434 X |
| 2,429,216 | 10/1947 | Bollman et al. | 324/85 |
| 3,629,696 | 12/1971 | Bartelink | 324/57 R |

Primary Examiner—Benedict V. Safourek
Attorney—R. J. Guenther and William L. Keefauver

[57] ABSTRACT

First and second waves at distinct frequencies are mixed to produce a third wave at their difference frequency. The phase difference between this third wave and a wave at the same frequency from a local oscillator is then detected to produce an output which is directly related to the phaseal relationship between the first and second waves.

4 Claims, 1 Drawing Figure

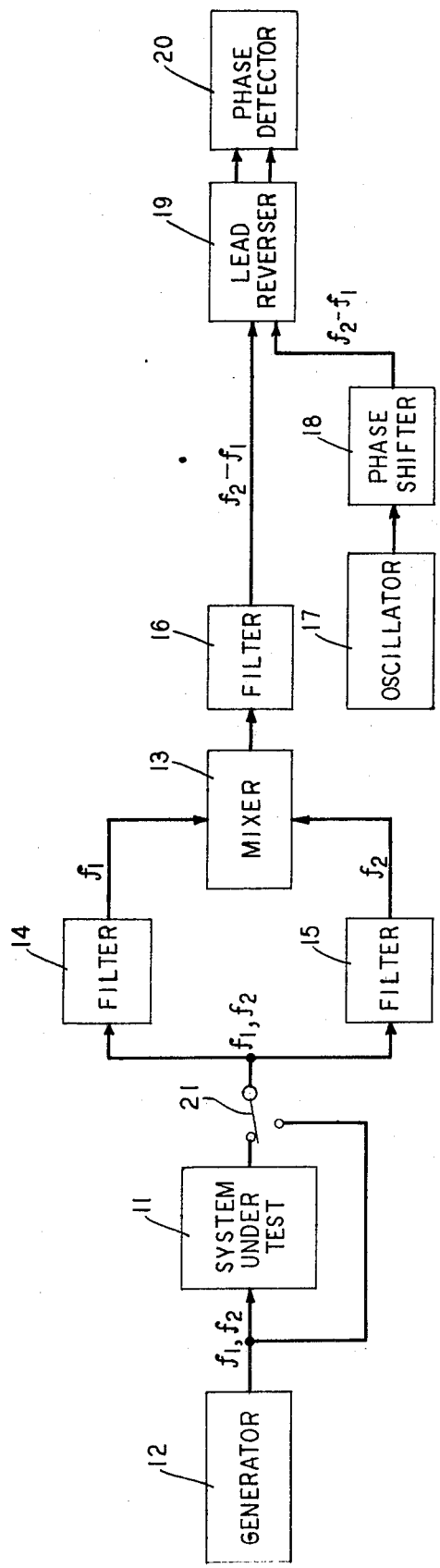

APPARATUS FOR USE IN MEASURING PHASE DISPERSION PRODUCED BY APPARATUS OR A SYSTEM

BACKGROUND OF THE INVENTION

1. Field of the Invention

This invention relates to measuring phase dispersion produced by apparatus or a system.

2. Description of the Prior Art

Two fixed, distinct frequency waves may be defined by the expressions $$A_1 \cos(\omega_1 t + \Phi_1) \text{ and}$$

$$A_2 \cos(\omega_2 t + \Phi_2), \text{ respectively,}$$

where $\Phi_1$ and $\Phi_2$ equal the phase angles of the waves. When these waves pass through apparatus or a system, they may experience a phase dispersion in the sense that the waves are not phase delayed by the same amount. In many cases it is not only desirable but necessary to be able to measure such changes in phaseal relationship. The prior art, however, does not appear to disclose apparatus for making such measurements.

SUMMARY OF THE INVENTION

An object of the present invention is to produce an indication which is directly related to the phaseal relationship between two waves having fixed, distinct frequencies.

This and other objects of the invention are achieved by first mixing two waves at frequencies $f_1$ and $f_2$, respectively, to produce a third wave at a frequency $(f_2-f_1)$. The phase angles of the initial waves, as will become apparent in the following detailed discussion of a specific embodiment of the invention, are carried into the third wave. The phase difference between this third wave and a locally generated fourth wave at the same frequency is then measured by a conventional prior art phase detector of the type which produces an output related to the phase difference between two like frequency waves.

BRIEF DESCRIPTION OF THE DRAWING

The drawing illustrates a block diagram of an embodiment of the invention being used for measuring the phase dispersion of a system.

DETAILED DESCRIPTION OF THE DISCLOSED EMBODIMENT

The block diagram shown in the drawing illustrates an embodiment of the invention in use for measuring phase dispersion occurring within a system 11. For measuring purposes, a generator 12 applies a pair of waves at frequencies $f_1$ and $f_2$, respectively, to system 11. Such a generator may use a highly stable crystal-controlled oscillator as a driving source to produce highly stable output waves at frequencies $f_1$ and $f_2$. For the present, these frequencies are assumed to be constant in value.

System 11 may comprise, for example, a system wherein the waves from generator 12 are up-converted frequency wise at its input end and down-converted to the original or some other frequencies at its output end. Phase dispersion within system 11 will, of course, cause the phaseal relationship of the waves at its output end to differ from that of the waves at its input end. The invention permits this difference to be measured.

In accordance with the invention, the output waves at frequencies $f_1$ and $f_2$ from system 11 are mixed together in a mixer 13. When necessary, filters 14 and 15 may be inserted between system 11 and mixer 13 inputs, respectively, so as to heavily attenuate undesired waves. When waves at frequencies $f_1$ and $f_2$ are transmitted by respective channels in system 11, such filters are unnecessary.

Mixer 13 produces waves at the usual frequencies including those at the sum and difference of its input wave frequencies. These waves are applied to a filter 16 which has a bandpass characteristic centered at the frequency $(f_2-f_1)$. The attenuation provided by filter 16 in effect passes only the difference frequency wave from mixer 13. An oscillator 17 produces a wave at the frequency $(f_2-f_1)$. This wave is phase controlled by a phase shifter 18. The like frequency waves from filter 16 and phase shifter 18 are applied through a lead reverser 19 to a conventional phase detector 20 which produces an indication, such as by a meter, of the phase difference between the two waves.

For an understanding of the operation of the invention, the waves produced by generator 12 may be defined as $$A_1 \cos(\omega_1 t + \phi_1) \text{ and} \qquad (1)$$

$$A_2 \cos(\omega_2 t + \phi_2), \text{ respectively,} \qquad (2)$$

where $\phi_1$ and $\phi_2$ equal the initial phase angles of the waves (i.e., at time equal to zero).

In one use of the invention the two waves from generator 12 are applied directly to the embodiment of the invention illustrated in the drawing (i.e., by bypassing system 11 through the operation of a switch 21). When this is done, the output of filter 16 may be defined as $$A_3 \cos[(\omega_2-\omega_1)t + \phi_2-\phi_1] \qquad (3)$$

The output from phase shifter 18 may be defined as $$A_4 \cos[(\omega_2-\omega_1)t + \phi_0]. \qquad (4)$$

Detector 20 produces an indication of the difference in phase between Expressions (3) and (4). In other words, the indication from detector 20 is the difference between $\phi_1$ and $\phi_2$, plus or minus $\phi_0$.

When switch 21 is positioned to apply the outputs of system 11 to the embodiment of the invention, the outputs from filter 16 may be defined as $$A_5 \cos[(\omega_2-\omega_1)t + \phi_2-\phi_1+\phi_2{}^s-\phi_1{}^s] \qquad (5)$$

where:

$\phi_1{}^s=$ the phase angle added to the $f_1$ frequency waves by the system 11, and $\phi_2{}^s=$ the phase angle added to the $f_2$ frequency waves by system 11.

Detector 20 detects the phase difference between Expressions (4) and (5) which difference is $$\phi_1-\phi_2-\phi_0+\phi_1{}^s-\phi_2{}^s. \qquad (6)$$

The difference between this value and the value obtained when connecting the embodiment directly to generator 12, as discussed previously, equals the phase dispersion introduced by system 11.

When using the invention as discussed above, phase shifter 18 and lead reverser 19 may be eliminated as they are unnecessary in that mode of operation. These two elements, however, are useful when the output of generator 12 cannot be applied directly to the embodiment of the invention so that the oscillator phase angle $\phi_0$ can be eliminated by subtracting one reading from another. In particular, lead reverser 19 is operable to reverse the inputs to phase detector 20. In operation, shifter 18 is adjusted so that the indication produced by phase detector 20 is substantially constant when lead reversals are produced by reverser 19. When this occurs, phase angle $\phi_0$ has been reduced to substantially zero, thus not affecting the output indication of phase shifter 20.

A more specific set of expressions which includes terms for frequency drifting modifies Expression (6) to become $$[\Delta\omega_2-\Delta\omega_1-2\Delta\omega_0]t+\phi_1-\phi_2-\phi_0+\phi_1{}^s-\phi_2{}^s. \quad (7)$$

When the frequency dispersion of system 11 is constant over a period of time, this drifting effect can be reduced by either manually or automatically controlling the frequency of oscillator 17. In particular, the change (as a function of time) in the output of detector 20 indicates the cumulative drifting effect. This drifting effect may be reduced by using the change in output of detector 20 to control the frequency of oscillator 17. When, on the other hand, the frequency dispersion of system 11 is undergoing changes at a rate sufficient to interfere with control of the above-described type, the alternative is to use more highly stabilized oscillators.

The invention lends itself to measuring in a simultaneous manner the phase dispersion over segments of a frequency band. This is accomplished by using a generator 12 which produces a plurality of equally frequency-spaced waves and adding additional channels and phase detectors. Specifically, two segments may be simultaneously measured by having generator 12 produce three waves at frequencies $f_1$, $f_2$ and $f_3$ where $f_2-f_1=f_3-f_2$, connecting another filter-mixer-filter combination to the output of system 11, connecting filter 15 to the newly added mixer, and connecting another phase detector between the last filter of this newly added combination and phase shifter 18. The bandpass of the first filter of the newly added combination is centered at frequency $f_3$ while the last filter in the newly added combination is centered at frequency $(f_2-f_1)$. Centering at this last-mentioned frequency and using the $(f_2-f_1)$ output of phase shifter 18 is possible because of selecting frequency $f_3$ so that $f_2-f_1=f_3-f_2$. From this it is believed clear that any number of additional channels may be added and that the output of phase shifter 18 may be used as one of the inputs for all of the phase detectors as long as the frequency differences between adjacent channels are made constant.

Other apparatus for producing an output related to the phaseal relationship between two waves at distinct frequencies is disclosed in U.S. Pat. No. 3,675,136, issued to K. C. O'Brien on July 4, 1972, filed of even date herewith and assigned to the same assignee as the present application. On the one hand, the O'Brien apparatus requires more equipment than required for the present apparatus while, on the other hand, it is more sensitive.

What is claimed is:

1. A combination for detecting the phasal dispersion produced between an input terminal and an output terminal of a system, said combination comprising:

a source of unmodulated waves at frequencies $f_1$ and $f_2$, respectively, means for applying said unmodulated waves to said system input terminal, mixing means for receiving on two input terminals waves at frequencies $f_1$ and $f_2$, respectively, and producing an output including a wave having a frequency equal to $(f_2-f_1)$, means for connecting said system output terminal to said mixing means input terminals to provide the only inputs to said mixing means, bandpass filtering means centered at the frequency $(f_2-f_1)$ and connected to receive the output of said mixing means, an oscillator for producing waves at the frequency $(f_2-f_1)$, a phase detector for producing outputs indicative of the phase difference between two input waves, and means connecting said bandpass filtering means and said oscillator to said phase detector whereby the outputs from said filtering means and said oscillator comprise said phase detector input waves.

2. The combination in accordance with claim 1 which further comprises a pair of bandpass filtering means centered at the frequencies $f_1$ and $f_2$, respectively, and connected in series with said mixing means input terminals, respectively.

3. A combination for detecting the phasal dispersion produced between an input terminal and an output terminal of a system, said combination comprising:

a source of unmodulated waves at frequencies $f_1$ and $f_2$, respectively, means for applying said unmodulated waves to said system input terminal, mixing means for receiving on two input terminals waves at frequencies $f_1$ and $f_2$, respectively, and producing an output including a wave having a frequency equal to $(f_2-f_1)$, means for connecting said system output terminal to said mixing means input terminals to provide the only inputs to said mixing means, bandpass filtering means centered at the frequency $(f_2-f_1)$ and connected to receive the output of said mixing means, an oscillator for producing output waves at the frequency $(f_2-f_1)$, a phase shifter connected to said oscillator for controlling the phase of said waves produced by said oscillator, a phase detector for producing outputs indicative of the phase difference between a pair of input waves applied thereto, and a lead reversing means connected between said filtering means, said phase shifter, and said phase detector to alternate the order in which the outputs from said filtering means and said phase shifter are applied to said phase detector as said phase detector input waves.

4. The combination in accordance with claim 3 which further comprises a pair of bandpass filtering means centered at the frequencies $f_1$ and $f_2$, respectively, and connected in series with said mixing means input terminals, respectively.

* * * * *